United States Patent [19]

Caruso et al.

[11] Patent Number: 4,593,956
[45] Date of Patent: Jun. 10, 1986

[54] LONG TUBE BENDER ELEMENT SQUEEZE BEARING

[75] Inventors: Mark B. Caruso, Pasadena, Calif.; Robert A. Scranton, South Salem, N.Y.

[73] Assignee: International Business Machines Corporation, Armonk, N.Y.

[21] Appl. No.: 645,741

[22] PCT Filed: Dec. 30, 1982

[86] PCT No.: PCT/US82/01828
§ 371 Date: Aug. 13, 1984
§ 102(e) Date: Aug. 13, 1984

[87] PCT Pub. No.: WO84/02755
PCT Pub. Date: Jul. 19, 1984

[51] Int. Cl.[4] .......................................... F16C 32/06
[52] U.S. Cl. ..................................... 384/1; 384/114; 384/12
[58] Field of Search ............... 384/114, 107, 100, 121; 308/5 R, 1 R

[56] References Cited

U.S. PATENT DOCUMENTS

| | | | |
|---|---|---|---|
| 2,978,597 | 4/1961 | Harris | 310/8.2 |
| 3,339,421 | 9/1967 | Warnock | 74/5 |
| 3,351,393 | 11/1967 | Emmerich | . |
| 3,365,680 | 1/1968 | Geil | 333/71 |
| 3,390,559 | 7/1968 | Steutzer | 70/275 |
| 3,420,110 | 1/1969 | Evans | 74/5.5 |
| 3,433,538 | 3/1969 | Blanding et al. | . |
| 3,561,253 | 2/1971 | Dorman | 73/28 |
| 3,582,698 | 6/1971 | Baker | 310/8.2 |
| 3,902,084 | 8/1975 | May | 310/8.1 |
| 3,997,954 | 12/1976 | White | . |
| 4,140,936 | 2/1979 | Bullock | 310/328 |
| 4,169,984 | 10/1979 | Parisl | 310/323 |

Primary Examiner—Lenard A. Footland
Attorney, Agent, or Firm—Graham S. Jones, II

[57] ABSTRACT

Tubular, pneumatic, vibratory transducer bearings incorporate a pair of colinear nested tubes with differing radii joined together at their inner and outer radii respectively. The mode of oscillation of the structure is designed to produce minimal vibration of the load carried on points of low vibration on the surface of the inner tube. The inner tube is far longer than the outer tube which is piezoelectrically excited at the correct frequency to produce the mode of oscillation desired for low vibration, automatically or self-pressurized bearing arrangement. The tubes are cylindrical and the inner tube rides on a cylindrical rod. The mounting points are at saddle points on the surface of the inner tube. The shortness of the outer tube of the transducer reduces the weight of the transducer.

5 Claims, 23 Drawing Figures

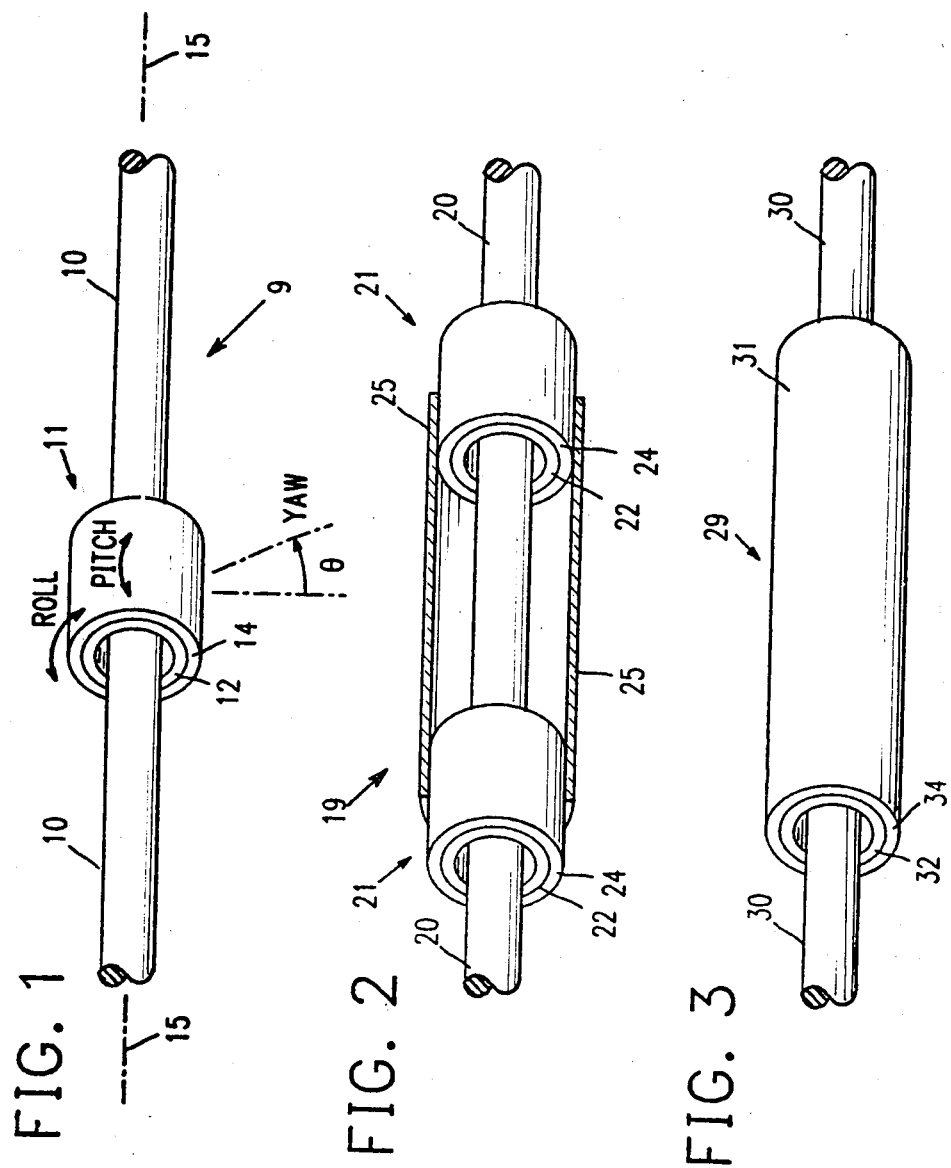

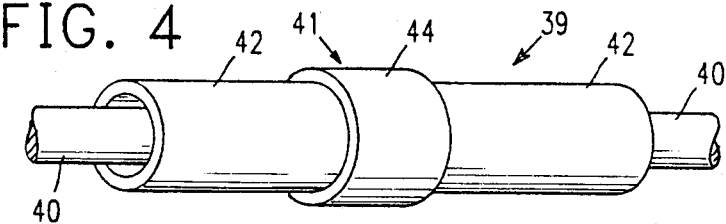
FIG. 4
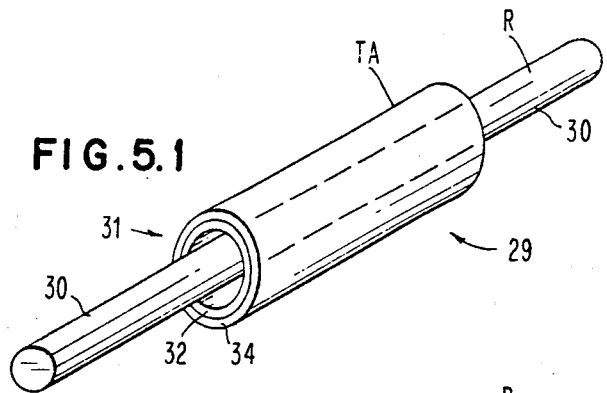
FIG. 5.1
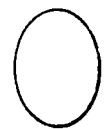
FIG. 5.4
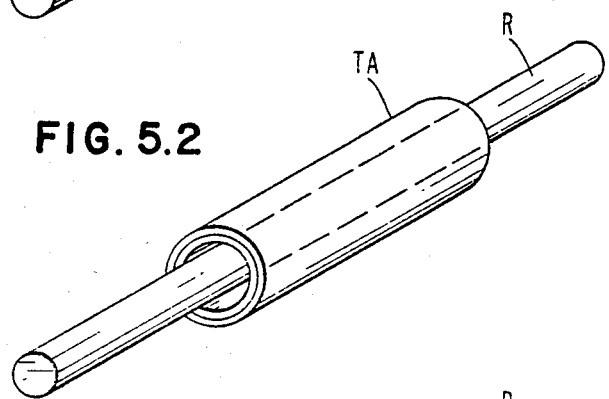
FIG. 5.2
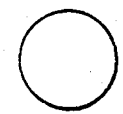
FIG. 5.5
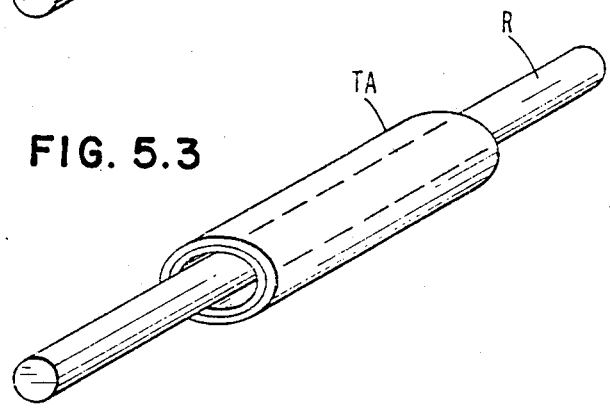
FIG. 5.3
FIG. 5.6
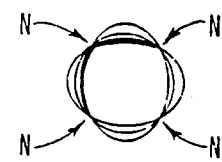
FIG. 5.7

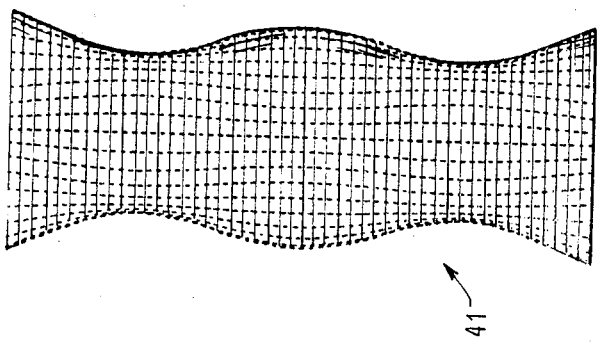
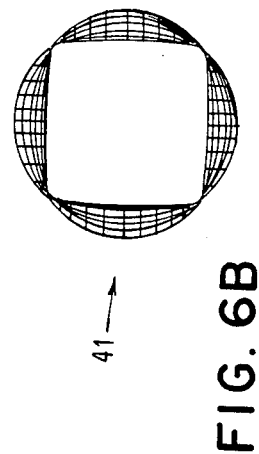
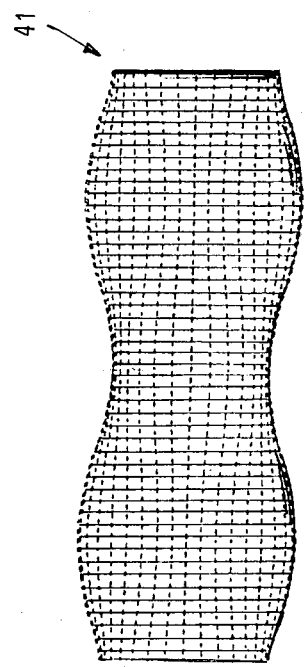
FIG. 6C
FIG. 6B
FIG. 6A

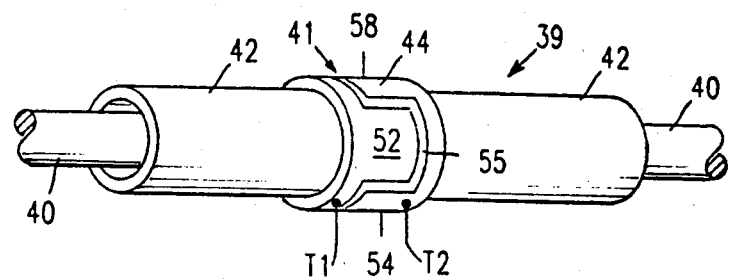
FIG. 9.1
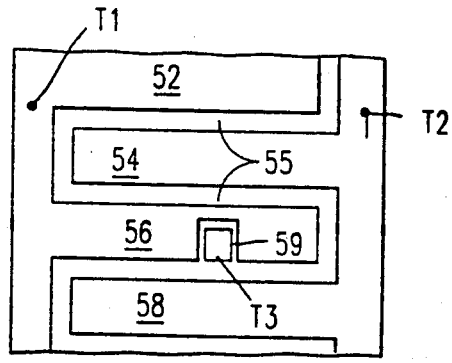
FIG. 9.2
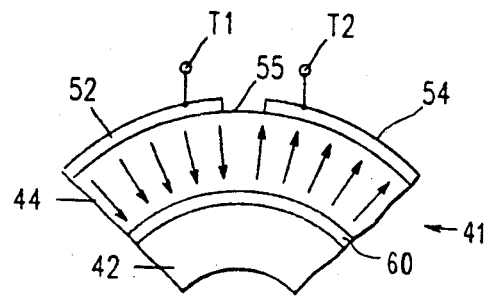
FIG. 9.3

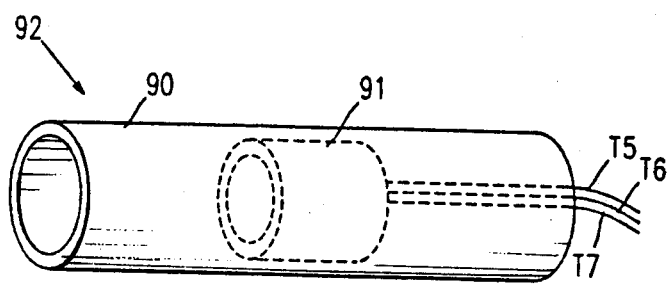
FIG. 10.1
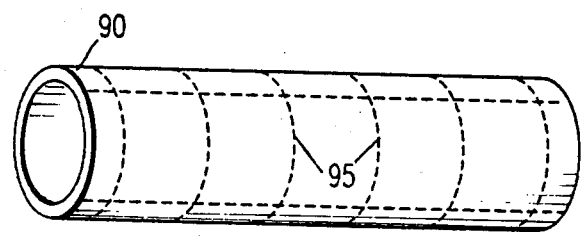
FIG. 10.2

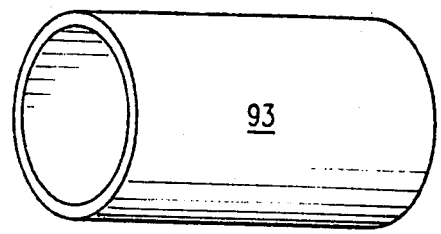
FIG. 10.3
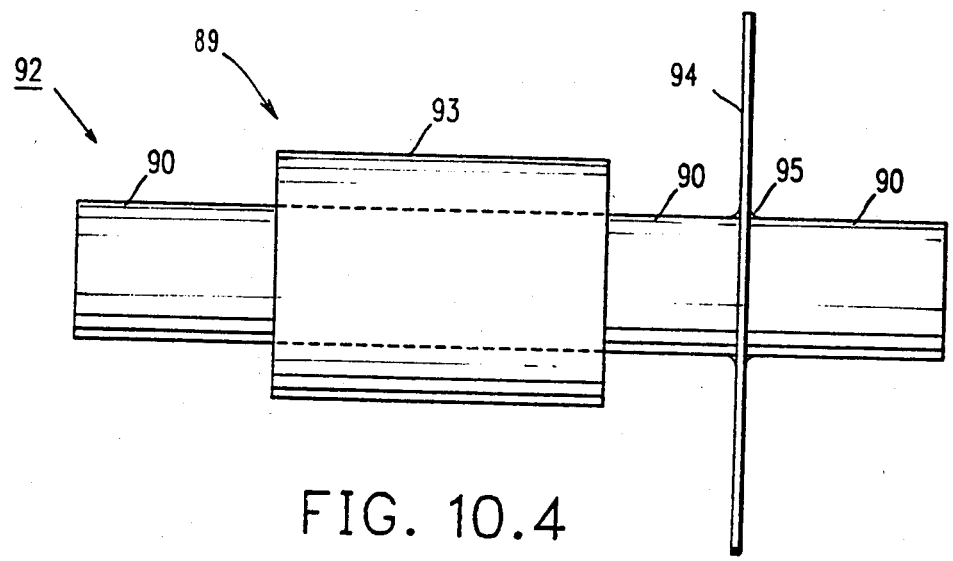
FIG. 10.4

LONG TUBE BENDER ELEMENT SQUEEZE BEARING

TECHNICAL FIELD

The present invention relates to vibratory pneumatodynamic bearings and more particularly to oscillating fluid bearings especially of the pneumatic variety which operate under standard pressure conditions.

BACKGROUND ART

Frictionless and low-friction bearings are useful in a variety of mechanical instruments, including actuators for the movement of magnetic recording heads in computer disk file systems. Pneumatic bearings are useful for supporting loads with low friction. While some pneumatic bearings are supplied with an external source of air under pressure to separate the bearing surfaces for purposes of pneumatic lubrication, it is possible with a pneumatodynamic bearing with a built-in transducer to generate air pressure in the bearing. One form of pneumatodynamic bearing is shown as a squeeze bearing, from the work of E. O. Salbu "Compressible Squeeze Films and Squeeze Bearings", Trans. ASME Journal of Basic Engineering, June 1964. A pumping action is caused by high frequency oscillations of a disk-shaped bearing which occurs at such a high frequency that the gas cannot flow out of the bearing space fast enough to avoid compression. It is also referred to as pumping action attributable to compression occurring in the compressible gas film.

U.S. Pat. No. 3,339,421 for a "Dynamic Gas Film Supported Inertial Instrument" describes a cylindrical PZT piezoelectric cylinder providing pulsations of the entire cylinder to provide a gaseous squeeze bearing about the periphery of the cylinder and on its axial ends in a gyroscopic mounting.

Copending and commonly assigned U.S. patent application Ser. No. 273,280 filed June 12, 1981 for "Planar and Cylindrical Oscillating Pneumatodynamic Bearings" of Scranton describes a pneumatodynamic bearing in cylindrical form with an inner tubular portion of molybdenum and an outer tubular layer of piezoelectric material. The bearing flexes and unflexes at the frequency of excitation applied to the bearing. The bearing is mounted at a mechanical node of its vibration. This form of mounting is intended to reduce the vibration which is passed on to the load which can be a magnetic recording head which is to be positioned accurately with respect to a magnetic recording medium upon which data is stored with great density. Accordingly, to locate the magnetic recording head in its correct position accurately and quickly, vibration must be minimized.

Tubular squeeze bearings nominally provide constraint against four degrees of freedom, two of which are freedom of rotation and two of which are freedom of translation. These four constraints leave the shaft of the bearing free to rotate (roll) about its axis and to translate along the length of its axis.

It has been found by experimentation that optimum constraint against pitch and yaw requires further improvements for linear actuator applications such as for actuators for magnetic recording disks.

A linear tubular bearing comprises a tubular member and a rod which supports the tubular member slideable along the length of the rod. The tubular member comprises a transducer composed of two colinear tubes, of sufficient length to afford some improvement in the constraint against pitch and yaw rotation. The tubes are shown to be cylindrical.

SUMMARY OF THE INVENTION

In a tubular form of pneumatodynamic bearing which oscillates to produce vibration which supports a rod within the tubular bearing, in accordance with this invention an improvement provided comprises a bearing incorporating a transducer comprising an elongated tube with a piezoelectrically energizable tube bonded thereto for generating resonant oscillations of the elongated tube. One tube is surrounding the other tube, in part. The mode of vibration of the transducer produces nodal lines and nodal circles along the length of the elongated tube.

SADDLE POINTS

The load is mounted at the points of intersection of the nodal lines and nodal circles; these points of intersection are called saddle points.

Preferably, the elongated tube is formed from pyrex glass and the transducer tube is composed of piezoelectric ceramic (PZT-4) material.

As contrasted with the colinear tube bearing approach described above, this invention employs a single long tube with just one short coaxial piezoelectric tube. The short piezoelectric tube excites a resonant flexural mode of oscillation in the long tube. Only one set of drive electronics equipment is required to operate the bearing and less piezoelectric material is required in order to operate the bearing in the desired mode. Moreover alignment is built into the system.

Another aspect of this invention is that the two nested or colinear (coaxial) tubes of the transducer can be duplicated so that there are two shorter colinear, i.e., "concentric", tubes and joined together by means of a pair of beams. However, the use of two colinear tubes in a bearing transducer is an arrangement which requires one of two difficult choices. One is a choice requiring rigid beams having difficulty in alignment. The other choice requires the use of flexures, prone to resonances. Additionally, two sets of drive electronic systems are required for such a solution.

In accordance with this invention, a tubular form of pneumatodynamic bearing includes a pair of elements having juxtaposed bearing surfaces wherein the bearing employs oscillation of at least one of the surfaces relative to the other thereof to produce pumping of air under pressure between the juxtaposed surfaces to produce pneumatic pressure within the bearing to separate the bearing surfaces pneumatically with one of the surfaces floating upon the air under pressure with the bearing including tubularly-shaped means for transducing comprising a pair of nested tubular members with one nested inside the other thereof in intimate mechanical contact with one of the nested tubular members being electrostrictive, the nested members being in a supporting relationship with another tubular member which includes one of the bearing surfaces, the improvement comprising, the bearing having a predetermined length with a given one of the nested tubular members of the means for transducing being substantially shorter than the length of the bearing whereby the weight of the bearing is substantially lower than it would be if the given one of the tubular members were continuous, while the tilting of the bearing members on the shaft member is minimized.

Preferably, the tubular members of the bearing are adapted to a mode of vibration providing saddle points where nodal loci intersect upon the surface of the inner one of the nested tubular members, and load mounting points are located at the saddle points.

Preferably, the inner and outer ones of the nested tubular members are split apart and linked together by beam elements bonded thereto at opposite ends of the means for transducing.

Still further, it is preferred that the nested tubular elements of the means for transducing are composed of an inner relatively longer tubular member composed of glass and the outer one of the nested tubular members is bonded to the inner one of the nested members in the medial portion thereof, and the outer one of the members is composed of piezoelectric ceramic material.

Preferably, the inner and outer ones of the nested tubular members are discontinuous and extend coaxially along the axis of the tubular member and the discontinuous tubular members are linked together by beam elements bonded thereto at opposite ends of the means for transducing.

The nested elements of the means for transducing are composed of a first relatively longer tubular member composed of glass and a second one of the nested tubular members is bonded to the first one of the nested members in the medial portion thereof, and the second one of the members is composed of a piezoelectric ceramic material, wherein the first and second tubular member are of different radii so that one of the first and second tubular members is housed within the other coaxially.

Preferably, the tubular elements of the means for transducing are formed by shrinkage of a glass tube onto a mandrel with dimensions of high precision.

A method of manufacturing bearings with tubular transducer elements, the means for transducing comprising a glass tube and another element of a different diameter than the diameter of the tube, the glass tube being made by the process of shrinkage of a glass tube onto a mandrel having highly precise dimensions.

The foregoing and other objects, features and advantages of the invention will be apparent from the more particular description of the preferred embodiments of the invention, as illustrated in the accompanying drawings.

BRIEF DESCRIPTION OF THE DRAWINGS

FIG. 1 shows a prior art form of a bearing incorporating a tubular actuator with a colinear nested arrangement of cylindrical squeeze tubes.

FIG. 2 shows a modified form of tubular actuator for a bearing constructed in accordance with this invention, with two short coaxially aligned cylindrical tubes joined together by means of links members or struts which hold them aligned colinearly with their axes substantially coaxial with the rod carrying the actuator.

FIG. 3 shows another prior art form of tubular actuator of the kind shown in FIG. 1 with longer tubes.

FIG. 4 shows a modified form of the tubular actuators of FIGS. 1 and 3 in accordance with this invention.

FIGS. 5.1 to 5.7 show the prior art method of mounting supports for a load on the actuator of a tubular bearing.

FIGS. 6–8 show the mode of vibration of a preferred embodiment of the instant invention.

FIGS. 9.1–9.3 show the arrangement for the electrodes required to deform tubes in accordance with this invention.

FIGS. 10.1–10.4 show another embodiment of this invention with the elements reversed from the inside to the outside.

Figure 7:
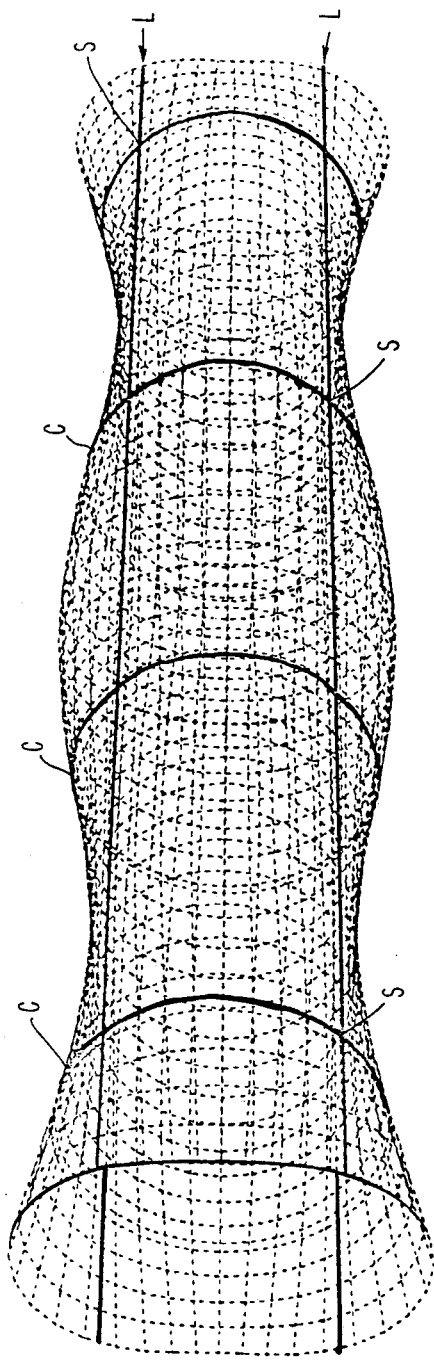

Although the figures show only whole right circular cylinders for the tubular members of this invention, arcuate segments, perforation and concentric out-of-roundness would be suitable for inclusion in an embodiment of this invention.

In the drawings, like elements are designated with similar reference numbers, and identical elements in different specific embodiments are designated by identical reference numbers.

DESCRIPTION OF THE PREFERRED EMBODIMENT

FIG. 1 shows a prior art form of a colinear arrangement of two cylindrical squeeze tubes forming a bearing transducer in accordance with the copending application Ser. No. 273,280 which forms a single bearing transducer 11 for supporting a rod 10, for rotation about its longitudinal axis 15 or for sliding along axis 15. The collinear tubes 12 and 14 form the transducer 11 of the bearing 9. The tubes 12 and 14 are composed of piezoelectric ceramic (lead zirconate titanate) material, or one tube is piezoelectric and the other is an inert material such as molybdenum.

While this arrangement provides a satisfactory support for some applications, it can be seen that in view of the shortness of the colinear tubes, the angle theta is indicative of the potential angle of rotation (i.e., pitch or yaw) of the axis 15 of the rod 10 within the inner tube 12.

FIG. 2 shows an improvement in accordance with this invention with a transducer 19 comprising a pair of transducer elements 21 each being formed from a pair of collinear tubes 22 and 24 which are joined together by means of the links 25 which are bonded to the outer surface of the transducer elements 21. This provides improved constraint against rotation, but it requires alignment or flexure and it requires two drivers for the two separate transducer elements 21, which support the rod 20, which is otherwise the same as rod 10 in FIG. 1, except for the new elements 21 of transducer 19.

FIG. 3 shows a longer version of the arrangement of FIG. 1 with a bearing 29 having only a single long transducer element 31 which is composed of a pair of collinear tubes 32 and 34 which provide the bearing surface and the vibratory support of the rod 30. The problem with this arrangement which is described in copending application Ser. No. 273,280, is that it incorporates high mass into the structure of the transducer element 31. High mass is to be avoided since it slows the speed of motion of the transducer which is a problem if the transducer is a part of a magnetic recording head drive in a magnetic recording disk system. In such a recording disk system speed is a major factor in equipment design.

FIG. 4 shows an improved version of the colinear bearing in accordance with this invention. The bearing 39 includes the transducer 41 comprising the elongated inner tube 42 carrying the rod 40 and the outer tube 44 which is much shorter in length in order to minimize the mass of the collinear arrangement of tubes. The short tube 44 excites a resonant flexural mode of vibration in the inner tube 42. Only one set of drive electronics is required and less piezoelectric ceramic material is required. Alignment is not a problem since the inner tube is integral.

FIGS. 5.1 to 5.7 show the previous method of mounting the transducer tubes at a node, N, of the resonance of the structure in order to minimize coupling of the resonant mode of vibration to the mass supported by the bearing and the shaft 40. However, although the displacement is zero at a node, the motion of the resonance of the tubular transducer structure still produces a change in the slope angle at the node. This can be seen by reference to FIGS. 5.1 to 5.7.

FIG. 5.1 shows a tubular bearing 29 comprised of a tubular transducer 31 and a rod 30. The cylindrical transducer 31 comprises a piezoelectric ceramic tube 34 bonded to a collinear tube 32, i.e., the two tubes are concentric with each other. In addition, the inner diameter of tube 34 is substantially the same as the outer diameter of tube 32. Flexural vibrations of transducer 31 generate sufficient air pressure to support the transducer upon a film of air between the inner surface of tube 32 and the supporting rod 30 which is rigidly affixed to support members not shown for convenience of illustration. The mechanical clearance between transducer 31 at its inner surface of tube 32 and the outer surface of rod 31 is extremely small, within the range from about one micrometer to about 0.25 millimeter. The clearance space is exaggerated in the drawings for clarity of illustration.

FIG. 5.1 shows the transducer 31 frozen in motion at one instant of time when it is at a peak of its vibratory cycle with the normally cylindrical transducer distorted by the vibration into an elliptical right prism, with the vertical radius shown to be longer than the horizontal radius of the cross-section of the cylinder 31 as can be seen in FIG. 5.4, which shows the cross-sectional shape of the cylinder 31. The amplitude of distortion is less than the above-described clearance and is shown to be exaggerated in FIGS. 5.1–5.3 for convenience of illustration and elucidation. The vibration of the transducer 31 is excited by an electrical driver circuit having electrodes connected by the piezoceramic material.

FIG. 5.2 shows the same transducer 31, in an instant of its vibratory cycle distinct from that shown in FIG. 5.1. In FIG. 5.2 the transducer 31 is in the undeformed shape of a nominal right circular cylindrical tube. FIG. 5.5 shows the corresponding round cross-section of the transducer 31 at the instant of vibration depicted by FIG. 5.2.

FIG. 5.3 shows the same transducer 31, at another instant of time 180 degrees out of phase with the instant of time depicted by FIG. 5.1. In FIG. 5.3, the transducer 31 is distorted by vibratory motion into an elliptical right prism again with the angle of distortion at a 90 degree angle to that in FIGS. 5.1 and 5.4 extending horizontally. FIG. 5.6 shows the cross-sectional shape corresponding to the arrangement of FIG. 5.3.

OPERATION OF TRANSDUCER

In operation, the transducer 31 moves smoothly during each cycle from the shape depicted by FIGS. 5.2 (5.5) to the shape depicted by FIG. 5.1 (5.4), back to the shape depicted by FIG. 5.2 (5.5) to the shape depicted by FIG. 5.3 (5.6) and back to the shape depicted by FIG. 5.2 (5.5). The corresponding cross-sectional shapes are depicted in a superimposed form in FIG. 5.7.

In FIG. 5.7, the letter N designates the location of nodal lines which are defined by the mathematical points which do not experience any radial vibrational amplitude. From examination of FIG. 5.7, it can be seen that a physical object mounted at the points N will, however, experience a rocking motion, or a slope change as the transducer proceeds through a vibratory cycle as described above. However, such objects will not experience direct radial or outward motion relative to the axis of cylindrical transducer 11.

While it is possible that proper mounting with a high degree of elasticity would reduce the coupling from the change in slope at the node, it is possible in accordance with this invention using the embodiment of FIG. 4 to reduce the change in slope to a far greater degree.

In accordance with the embodiment of FIG. 4, the mounting arrangement is superior in that the mass is supported at a saddle point of the oscillation of the surface of the structure of the longer one 42 of collinear tubes when they are oscillating in the resonance mode.

SADDLE POINT

The intersection of two nodal lines, or of a nodal circle and a nodal line is called a "saddle point," by topological analogy to the point located on the central portion of the topography of a saddle. The shape can be likened to a low ridge separating two juxtaposed mountains. As one proceeds from the middle of the "ridge" (saddle point) to either of the "valleys", the motion is "downhill". However, in the vicinity of a saddle point, the "terrain" is locally flat in all directions.

Similarly, in the vicinity of the intersection of a nodal line or nodal circle (saddlepoint), the topography of the surface of the transducer is essentially unchanged during one cycle of vibration. During one cycle of vibration, the "topography" may vary across the surface from "mountains and valleys" to "valleys and mountains," but there is neither motion nor slope change at the saddle point during the vibratory cycle relative to the axis of the cylinder. This means that transmission of vibration from such a point to a device attached to such a saddle point will be minimal.

In many applications of the frictionless squeeze bearings, such as in the support of a magnetic recording head actuator for a magnetic recording disk file, it is important to avoid vibration of the magnetic recording head as it approaches the site on the magnetic recording disk where the data to be read or stored is located. Such vibration would unfortunately be transmitted if the vibration of the transducer were coupled to the supported load, which in this case would be the magnetic recording head. Additionally, the transducer will require additional power or suffer reduced vibrational amplitude (reduction of mechanical resonance quality factor defined as "Q") if the vibration is coupled mechanically to a supported magnetic recording head or other load.

The previous patent application Ser. No. 273,280 of Scranton reduced this problem by mounting the supported load along the nodal lines (of a cylindrical tubular bearing) or of the nodal circles (of a flat disk bearing). However, the remaining low amplitude vibration coupled to the load using that method can present a problem when attempting to optimize the stability of the load in a very high resolution magnetic recording disk servo system. Such systems are delicate and must have minimal vibration to assure that the product employing the bearing has a high performance magnetic disk file actuator. The mechanical coupling of the vibration of the transducer to the supported load is caused by the rocking motion, or slope change which exists at a nodal circle or a nodal line.

MOUNTING

In other words, the bearing is mounted at the point of intersection of two nodal lines or nodal circles. At saddle points as illustrated by the large dots in FIG. 7, both the displacement and the slope of the displacement are zero. Thus, the coupling of the resonance vibration to the supported mass is further reduced. The saddle point is produced by driving the tube in a mode that has nodal circles C as well as nodal lines L. The chosen mode shown in FIG. 7 has four nodal circles C and four nodal lines L. This particular mode was chosen because its frequency of operation is well separated from the frequency of the modes with one, two, three or five nodal circles. This is true because there is less of a chance of oscillation in the wrong mode leading to vibration of the load.

FIG. 6A shows a plan (top) view of an instant during the vibration of the transducer 41 in the desired mode of vibration. For clarity of illustration, the vibration amplitude is exaggerated and the transducer is depicted as a tube without the details of piezoelectric parts and the electrode. FIG. 6B shows an end elevational view of the device at the same instant and FIG. 6C shows a side elevational view of the cylinder, for the same instant of time.

Figure 8:
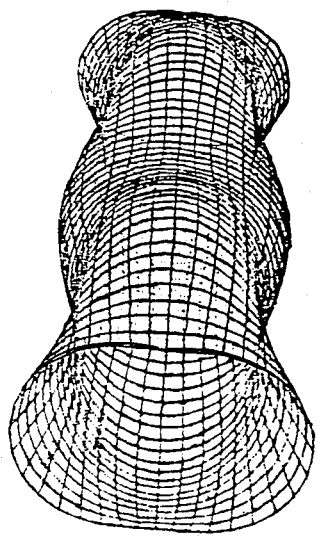

FIGS. 7 and 8 show a perspective view of the transducer 41, oscillating in the preferred mode. Letter C refers to nodal circles and letter L refers to the nodal lines and S indicates the saddle points.

A problem with past designs has been to identify a material which has low density, a high stiffness to mass ratio, and which can be fabricated to tight tolerances. Previous bearings have used molybdenum (which is machinable but heavy), ceramic (which must be ground and has a poor surface finish) or exotic materials (difficult to grind except with diamond bits). The embodiment of FIG. 4 uses commercially available Pyrex 7740 borosilicate glass commercially available from the Corning Glass Works which is formed by collapsing it onto a precision mandrel with the aid of a vacuum pump. The coefficient of thermal expansion almost matches that of piezoelectric ceramic material. The glass is lightweight and it has a stiffness-to-density ratio which is between those of molybdenum and alumina. Precision glass tubes are available commercially.

To form the inside of the glass tube in a precision manner, the interior, reuseable precision mandrel is made from material, such as stainless steel, which has a higher coefficient of thermal expansion than the glass. Thus, as the assembly cools below the glass setting temperature, the mandrel shrinks faster than the glass and becomes free. Alternately, the exterior of the glass can be made in a precision manner by expanding it when hot against a precision, reuseable bore hole with the aid of pressurized gas. The precision bore is made from a material with a lower coefficient of expansion than pyrex, such as graphite silicon nitride or fused silica. As the glass cools below its setting temperature, the glass contracts more than the precision bore hole and hence becomes free. This technique can provide precision surfaces for fluid bearings of the hydrodynamic type employing vibratory motion, of the hydrodynamic type employing lateral or rotary motion, and for externally pressurized bearings.

FIGS. 9.1 to 9.3 show the tubular arrangement of FIG. 4 with the practical arrangement of the electrodes required in order to make the tube deform in accordance with the desired requirements. The tubular transducer 41 comprises an inner tubular portion 42 of glass. About that is formed a tubular layer of piezoelectric material 44. Upon most of the outer surface of the layer 44 a thin film of plated material is applied to form electrodes 52, 54, 56, 58 and 59 separated by groove 55 which is shown in FIGS. 9.1-9.3.

FIG. 9.2 shows the external surface of the tubular actuator in FIG. 9.1 unwrapped to provide a flat surface in order to clarify the shape which is somewhat confusing in the perspective view of FIG. 9.1. The electrical contact lines T1 and T2 are aligned with the groove 55 where the node of the tube will be located. The inner glass portion 42 of the tubular actuator is at an intermediate electrical potential between the values at contacts T1 and T2 so that the deformation of the two sets of electrode segments 52,56 and 54,54 separated by the groove 55 will be in opposite directions and will provide a vibratory oscillation which pressurizes the space between the tubular transducer 41 and the rod 40 so there is no mechanical contact and a very low friction journal bearing is provided for slidable (or rotary) motion along the rod 40 with extremely low friction.

Electrode segment 59, separated by groove 55 from electrode segment 56, is contacted by electrical lead T3. Electrode segment 59 acts to provide a feedback voltage to the electronic circuit driving the tubular actuator through leads T1 and T2. The increase in amplitude of the voltage at T3, and a phase shift with respect to the driving voltage, enables the electronic circuit to keep the tubular actuator at the driven resonant frequency, despite small changes in that frequency by mechanical loading, aging or temperature changes. These electronic circuits are known as phase-locked loops and phase shift oscillator and are well known to those skilled in the art of piezoelectric flexural transducers.

FIG. 9.3 is an end view of a fragment of tubular transducer 41 with the electric field on either side of the groove 55. The location of electrical contacts T1 and T2 are changed in order to show that the portion of transducer 41 under the electrode 54 expands when it is positive, while the reverse is true of the portion under electrode 52 when it is negative. An example of a tubular actuator arrangement is to employ a rod with an outside diameter or 9.517 mm and an inner diameter of the tubular actuator TA of 9.543 mm for a gap of 0.0125 mm between the surface of the rod and the actuator both top and bottom (side-to-side) when centered. The peak vibration amplitude of the actuator 41 is about 0.01 mm. Electrode segment 60 acts to provide a continuous electrical path at the interior of the piezoelectric tube.

Those skilled in the art will appreciate that the same electrode pattern can be used in an entirely different manner. The FIGS. 9.1 to 9.3 and the above explanation assumes that the piezoelectric material (PZT) is poled uniformly radially, as usually received from the manufacturer. Instead, by achieving an electrical contact to segment 60, the piezoelectric ceramic may be thermally depoled and then repoled. The temperatures and electric fields required for these processes are available from the piezoelectric material manufacturers. During repoling, the electrical lead T1 is given and applied voltage opposite from electrical lead T2. In this manner the region of PZT element 44 between electrode segment 60 and electrode segments 52 and 56, on opposite sides of the PZT element 44, will be poled in a radial direction with a polarity opposite that of the region of PZT element 44 between electrode segment 60 and electrode segments 54 and 58. Since the electrode segments associated with electrical leads T1 and T2 are poled in an opposite sense, then T1 and T2 may be driven with the same polarity of voltage to achieve an elliptical vibration shape. Thus T1 and T2 may be electrically connected together and driven electrically with respect to electrode 60. It should be recognized that this electrode configuration and poling technique reduces the necessary voltage by a factor of 2 and increases the required current by a factor of 2 so that no net powder advantage is accrued.

The electrode material is nickel plated to a thickness of 1-3 micrometers and the groove 55 is about 250-500 micrometers wide. The tubular suspension is stiff and has lower load capacity if the clearance is tight. It is also more susceptible to humidity affecting the loading of the bearing with condensed water. If the clearance is loose, then a greater load can be carried, positioning is less precise and the parts are easier to fabricate. If the suspension is not stiff enough, then play in the bearing can be excessive and accuracy of positioning is sacrificed.

The electrode pattern on an elliptical mode tube (journal) bearing consists primarily of four axially symmetrical electrodes as shown in FIGS. 9.1-9.3. The opposite electrodes segment 52 and 56 and opposite segments 54 and 58 are connected either by discrete wires or by smaller annular patterns at the ends of the plated electrode as shown in FIGS. 9.19.3. Since the piezoelectric ceramic is poled uniformly outwardly and the electric field is of opposite polarity under adjacent electrodes, the strain in the PZT material will be opposite under adjacent electrodes, causing one region to bend outwardly and the adjacent region to bend inwardly. Whether the PZT/glass laminate bends inwardly or outwardly varies with the product of the sign of the applied field and the sign of the poling direction of the PZT. In the above example in FIGS. 9.1-9.3, the PZT material was poled uniformly outwardly and the direction of the applied field under adjacent electrodes was changed in order to cause one region under one electrode to bend inwardly and the region under an adjacent electrode to bend outwardly. However, the PZT tube can be poled in opposite direction in different regions.

For example, the electrode pattern described in the previous example of FIGS. 9.19.3 could be used to pole the PZT material nonuniformly, by heating the PZT material to 150° C. and applying a field of 20 V/mil to the PZT material. Subsequent to this poling operation, the electrodes are bridged so that the entire outer surface of the PZT tube becomes an electrode and the entire inner surface becomes another electrode. The adjacent quadrants of the PZT material distort differently because although the field is uniform radially, the poling is opposite in adjacent quadrants. An added feature of this latter poling is that the voltage required to drive the device is reduced in half. However, the current required to drive the device is doubled. The total power required is identical in either example for the same bearing load capacity.

In the cases in which the squeeze bearing contains a piezoelectric bimorph of disparate materials, such as PZT with alumina or PZT with molybdenum, it should be recognized that a thermal expansion bimorph (analogous to a bimetallic strip) exists. This will cause physical warpage, and ultimate bearing failure, if the temperature is changed over a sufficiently large range. This problem can be overcome, if required, by use of differently poled PZT for both halves of the bimorph, by the use of a ceramic such as cordierite, or by the use of 7740 glass which can be matched in thermal expansion coefficient to that of PZT.

An additional constraint in the design of squeeze bearings is to avoid bearing failure caused by condensation of moisture in the bearing or on the bearing surfaces during the compression portion of the oscillatory cycle of air captured between the surfaces of the bearing. This reduces the effectiveness of such bearings under conditions of very high humidity, although heating of the bearing can be employed for the purpose of minimizing or eliminating the problem. Heating reduces the local relative humidity in the bearing when ambient conditions include high humidity. Alternatively, the bearing can be used in a hermetically sealed container or in a controlled (air conditioned or desiccant) atmosphere.

DETERMINATION OF MODE SHAPE AND LOCATION OF NODAL LINES/CIRCLES

The location of the nodal lines, nodal circles and the vibrational amplitude of the surface of the transducer can be monitored experimentally by first powering a bearing and monitoring its current as a function of voltage, as described on pp. 24-25 of copending patent application Ser. No. 273,280 of Scranton. The frequency is then adjusted for a resonance defined by maximum in-phase current. A conventional consumer audio stereo phonograph cartridge can be used to monitor the vibration amplitude of any spot on the surface of the transducer. When the needle of the cartridge is placed on the nodal lines or on the nodal circles, there will be little or no electrical output signal from the phonograph cartridge. The electrical output signal may be observed on an oscilloscope, after suitable amplification. As the phonograph cartridge is moved from a region of high vibration, called an antinode, across a nodal circle or line, and then to another antinode, the electrical signal will first be decreased, then go to zero and change phase as the node is crossed and then increase in amplitude as the second antinode is approached. The output may also be sensitively monitored by using phase sensitive detection, as will be appreciated by electronic engineers. Although any cartridge will work to some extent, a excellent choice is a solid ruby or solid diamond moving coil cartridge, as will be appreciated by those skilled in the art of high fidelity music reproduction.

In this manner, for each resonance of the transducer, a mode shape and nodal circle and nodal line pattern can be generated. These patterns can be also predicted by a finite element computer analysis.

The bearing described above comprises a first tubular element slideable on another tubular element. One embodiment is shown in FIGS. 9.1-9.3. It has an outer transducer assembly which is slideable on a tube 40 (which can be a tube or rod) located on the interior of the transducer element 41.

Alternatively, the outer transducer may be mounted nodally to a rigid stationary support member and the interior tube or rod can be moveable.

Another embodiment is the inside-out version of the above embodiment. The sequence of parts is reversed as one moves radially outwardly from the center of the bearing. Thus the inside and the outside are literally . . . reversed. An inside-out bearing 89 is shown in FIG. 10.4. The innermost part 91 of the bearing 89 is an element 91 (shown in FIG. 10.1) similar to element 44 in FIG. 9.1. Element 91 is connected electrically to a source of power by means of wires T5, T6 and T7. It is a piezoelectric element with electrodes provided on its inner surface. To facilitate electrical connection to the element 91, the wires T5, T6 and T7 are bonded to patterned electrode segments (not shown) on the inner surface of element 91. A uniform electrode is proved on the outer surface of element 91. Such connections will be obvious upon reference to the connections in FIGS. 9.1 and 9.2. Thus element 91 is an inside-out analog to element 44 in FIG. 9.1.

The long tube 90, preferably made of glass, has an outer surface made to a high degree of precision. Element 90 is an inside-out analog to element 42 which was made to a high degree of precision on its inner surface.

Transducer 92 is composed of elements 90 and 91 plus the associated electrical wiring harness T5, T6, T7. An electronic driver circuit operates transducer 92 at a resonant frequency. The mathematical nodal lines, nodal circles and saddle points corresponding to one resonance frequency are shown in FIG. 10.2. The electrode pattern of FIGS. 9.1 to 9.3 will produce strong resonances with four nodal lines and an even number of nodal circles. FIG. 10.2 shows four nodal lines and six nodal circles. Other numbers of nodal circles such as four or eight are available by driving at different frequencies selected by the electronics employed.

Element 93, shown in FIG. 10.3 is a passive slideable tube which does not require any electrical connection for it to be driven by the actuator 92.

FIG. 10.4 shows the inside-out bearing, supported at a nodal circle 95 by an epoxy bonded joint to a fixed plate or wall 94. Alternatively, nodal mounts for transducer 92 may be made at one or both ends of the tube 92 or at nodal circles or nodal lines, or at the surface 92 above the saddle points.

While we have stated that the tube 92 is bonded to the wall 94, it is equally possible to bond the tube 93 to the wall 94 and to let the tube 92 reciprocate within it in like manner. Thus the analogy to the other embodiments are complete.

The inside-out bearing depected in FIG. 10.4 has a fixed vibrating transducer and a slideable tube 93. The electrical wire contacts do not need to slide or translate.

Having thus described our invention, what we claim as new, and desire to secure by Letters Patent is:

1. A tubular form of pneumatodynamic bearing including a pair of elements having juxtaposed bearing surfaces wherein said bearing employs resonant flexural oscillation of at least one of said surfaces relative to the other thereof to produce pneumatic pressure within the bearing to separate said bearing surfaces pneumatically with one of said surfaces floating upon said air under pressure, with said bearing elements including tubularly-shaped means for transducing comprising a pair of nested tubular members with one nested inside the other thereof, with at least a segment of said one nested tubular members being in intimate mechanical contact with at least a segment of said other nested tubular member, with one of said nested tubular members being electrostrictive and providing resonant flexural oscillation of said nested tubular members, said nested members being in a supporting relationship with another tubular member which includes one of said bearing surfaces comprising, said bearing having a predetermined length with a given one of said nested tubular members of said means for transducing being substantially shorter than the length of the other of said tubular members and of said bearing, whereby the weight of said bearing is substantially lower than it would be if said given one of said tubular members were continuous, while the tilting of said bearing surfaces relative to each other is minimized.

2. A bearing in accordance with claim 1 wherein said tubular members are adapted to a mode of vibration providing saddle points where nodal loci intersect upon the surface of said inner one of said nested tubular members, and load mounting points being located at said saddle points.

3. A bearing in accordance with claim 1 wherein said inner and outer ones of said nested tubular members are discontinuous and extend coaxially along the axis of said tubular member and said inner and outer members are linked together by beam elements bonded thereto at opposite ends of said means for transducing.

4. A bearing in accordance with claim 1 wherein said nested tubular elements of said means for transducing are composed of a first relatively longer tubular member composed of glass and a second one of said nested tubular members is bonded to said first one of said nested members in the medial portion thereof, and said second one of said members is composed of a piezoelectric ceramic material, wherein said first and second tubular member are of different radii so that one of said first and second tubular members is housed within the other coaxially.

5. A bearing in accordance with claim 1 wherein said tubular elements of said means for transducing are formed by shrinkage of a glass tube onto a mandrel with dimensions of high precision.

* * * * *